(12) United States Patent
Liu et al.

(10) Patent No.: US 11,064,398 B2
(45) Date of Patent: Jul. 13, 2021

(54) RESOURCE PROCESSING METHOD, NETWORK-SIDE DEVICE, TERMINAL, AND SYSTEM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/490,583

(22) PCT Filed: Mar. 7, 2017

(86) PCT No.: PCT/CN2017/075901
§ 371 (c)(1),
(2) Date: Sep. 2, 2019

(87) PCT Pub. No.: WO2018/161261
PCT Pub. Date: Sep. 13, 2018

(65) Prior Publication Data
US 2020/0077306 A1      Mar. 5, 2020

(51) Int. Cl.
*H04W 4/00*      (2018.01)
*H04W 36/00*     (2009.01)
*H04W 76/36*     (2018.01)

(52) U.S. Cl.
CPC ... *H04W 36/0022* (2013.01); *H04W 36/0016* (2013.01); *H04W 36/0058* (2018.08); *H04W 76/36* (2018.02)

(58) Field of Classification Search
CPC ............. H04W 36/0022; H04W 76/36; H04W 36/0058; H04W 36/0016; H04W 36/14
(Continued)

(56) References Cited

U.S. PATENT DOCUMENTS 9,526,049 B2 * 12/2016 Yuk ................. H04W 24/08
2008/0049676 A1   2/2008 Xiang
(Continued)

FOREIGN PATENT DOCUMENTS

CN   101001460   7/2007
CN   101031132   9/2007
(Continued)

OTHER PUBLICATIONS

EPO, Office Action for EP Application No. 17900109.4, dated Dec. 9, 2019.
(Continued)

*Primary Examiner* — Chuong T Ho
(74) *Attorney, Agent, or Firm* — Hodgson Russ LLP

(57) ABSTRACT

Disclosed in the embodiments of the present disclosure are a resource processing method, a network-side device, a terminal, and a system. The method includes: a first network-side device acquiring association information concerning candidate networks for the terminal, the candidate networks at least comprising a second network, the terminal being switched from a third network to a first network, the first network-side device being applied to the first network; and the first network-side device releasing, according to the association information of the candidate networks, a switching preparation resource of the second network, the switching preparation resource of the second network being used for the switching of the terminal from the third network to the second network.

13 Claims, 6 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2011/0096660 | A1* | 4/2011 | Ikeda | H04W 36/36 370/225 |
| 2013/0316712 | A1* | 11/2013 | Lee | H04W 36/00 455/436 |
| 2014/0120921 | A1* | 5/2014 | Keskitalo | H04W 36/0016 455/438 |
| 2014/0302853 | A1* | 10/2014 | Militano | H04W 36/0055 455/436 |
| 2015/0045040 | A1* | 2/2015 | Lai | H04W 36/32 455/441 |
| 2015/0049623 | A1* | 2/2015 | Yuk | H04W 36/30 370/252 |
| 2016/0205600 | A1* | 7/2016 | Xu | H04W 36/36 455/437 |
| 2016/0219473 | A1* | 7/2016 | Teyeb | H04W 36/0055 |
| 2016/0277977 | A1* | 9/2016 | Wang | H04W 36/30 |
| 2017/0055187 | A1 | 2/2017 | Kang et al. | |
| 2018/0220340 | A1* | 8/2018 | Ramachandra | H04W 36/08 |
| 2018/0302831 | A1* | 10/2018 | Fan | H04W 36/08 |
| 2019/0191352 | A1* | 6/2019 | Chong | H04W 36/26 |
| 2019/0208380 | A1* | 7/2019 | Shi | H04L 12/1407 |
| 2019/0239131 | A1* | 8/2019 | Yang | H04W 72/046 |

FOREIGN PATENT DOCUMENTS

| | | |
|---|---|---|
| CN | 101505508 | 8/2009 |
| CN | 101668320 | 3/2010 |
| CN | 102405665 | 4/2012 |
| CN | 102577503 | 7/2012 |
| CN | 103188750 | 7/2013 |
| CN | 103188754 | 7/2013 |
| CN | 103648122 | 3/2014 |
| CN | 104301960 | 1/2015 |
| CN | 104662960 | 5/2015 |
| CN | 104883712 | 9/2015 |
| CN | 105228200 | 1/2016 |
| CN | 105517067 | 4/2016 |
| EP | 2086253 | 8/2009 |
| EP | 2244502 | 10/2010 |
| WO | 9905873 | 2/1999 |
| WO | 2014166456 | 10/2014 |
| WO | 2015017165 | 2/2015 |

OTHER PUBLICATIONS

WIPO, ISR for PCT/CN2017/075901, dated Nov. 29, 2017.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300, Dec. 2015, v13.2.0, 290 pages.
"3rd Generation Partnership Project; Technical Specification Group Services and System Aspects; System Architecture for the 5G System; Stage 2 (Release 15)," 3GPP TS 23.501, Apr. 2017, v0.4.0, 123 pages.
INAPI, Office Action for CL Application No. 2019-02553, dated Nov. 26, 2020.
IPI, Office Action for IN Application No. 201917039136, dated Jan. 29, 2021.
SIPO, First Office Action for CN Application No. 201780087452.X, dated May 14, 2021.
EPO, Communication for EP Application No. 17900109.4, dated May 12, 2021.

* cited by examiner

RESOURCE PROCESSING METHOD, NETWORK-SIDE DEVICE, TERMINAL, AND SYSTEM

CROSS-REFERENCE TO RELATED APPLICATION

This application is a U.S. national phase application of International Application No. PCT/CN2017/075901, filed Mar. 7, 2017, the entire disclosure of which is incorporated herein by reference.

TECHNICAL FIELD

The present disclosure relates to the field of communication technology, and more particularly, to a resource processing method, a network-side device, a terminal and a system.

BACKGROUND

The 4th Generation (4G) mobile communication networks, such as Long-Term Evolution (LTE) networks, have now achieved wide coverage. However, with the emergence of demands for networks such as the Internet of Things and the Internet of Vehicles, users are increasingly demanding next-generation mobile communication networks, that is, 5th Generation (5G) mobile communication networks. In mobile communication systems, handover is an essential significant feature. Since the coverage area of one base station is limited, and in order to maintain the continuity of communication during moving of the terminals, the wireless connection between the terminal and network should be transferred from one network (cell) to another network (cell), which is the handover.

In order to reduce handover latency, the 5G communication system introduces a terminal-based network handover technology, which includes the following procedures: a terminal is currently attached to a third network, and a third network-side device of the third network configures, for the terminal, a measurement configuration and a first measurement event for performing the network handover, and the terminal performs measurement on multiple networks based on the measurement configuration. When the measurement result of at least one network meets the first measurement event, the terminal reports the measurement report of the at least one network to the third network-side device, and the third network-side device determines, according to the measurement report reported by the terminal, at least one candidate network of the terminal in the at least one network, and configures a second measurement event for the terminal; and when the terminal detects that the measurement result of the first network in the at least one candidate network meets the second measurement event, the terminal performs a handover operation on the first network, realizing a handover from the third network to the first network.

SUMMARY

Embodiments of the present disclosure provide a resource processing method, a network-side device, a terminal and a system, which are beneficial to improve utilization efficiency of resources of a candidate network.

In a first aspect, according to an embodiment of the present disclosure, there is provided a resource processing method, including:

obtaining, by a first network-side device, association information of a candidate network of a terminal, the candidate network at least including a second network, the terminal being handed over from a third network to a first network, and the first network-side device being applied to the first network; and releasing, by the first network-side device, a handover preparation resource of the second network according to the association information of the candidate network, the handover preparation resource being used for the terminal to be handed over from the third network to the second network.

In a possible design, the releasing, by the first network-side device, the handover preparation resource of the second network according to the association information of the candidate network, includes:

when the first network-side device detects that a measurement result of the second network in the association information of the candidate network is smaller than a preset measurement result, determining to release the handover preparation resource of the second network; or, when the first network-side device detects that a measurement result of the second network in the association information of the candidate network is that there is no Xn interface between the first network and the second network, determining to release the handover preparation resource of the second network; or, when the first network-side device detects that a measurement result of the second network in the association information of the candidate network is that the first network and the second network are unfriendly networks, determining to release the handover preparation resource of the second network.

In a possible design, the releasing, by the first network-side device, the handover preparation resource of the second network according to the association information of the candidate network, includes:

when the first network-side device detects that a measurement result of the second network in the association information of the candidate network is smaller than a preset measurement result and information of a non-candidate network meets a preset handover condition, determining to release the handover preparation resource of the second network.

In a possible design, the obtaining, by the first network-side device, the association information of the candidate network of the terminal, includes:

receiving, by the first network-side device, a handover confirmation message sent by the terminal, and obtaining the association information of the candidate network of the terminal contained in the handover confirmation message.

In a possible design, the receiving, by the first network-side device, the handover confirmation message sent by the terminal, includes:

receiving, by the first network-side device, a first handover request sent by a third network-side device, configuring a handover preparation resource of the first network for the terminal and sending description information of the handover preparation resource of the first network to the third network-side device, the description information being used for the third network-side device to send handover configuration information of the first network to the terminal, the handover configuration information of the first network being used to instruct the terminal to measure the first network to obtain a first measurement result, and when it is detected that the first measurement result meets a first measurement event, send the handover confirmation message to the first network-side device; and receiving, by the first network-side device, the handover confirmation message sent by the terminal and completing a handover operation of the terminal according to the handover preparation resource of the first network.

In a possible design, the obtaining, by the first network-side device, the association information of the candidate network of the terminal, includes:

receiving, by the first network-side device, a handover response message sent by a third network-side device and obtaining the association information of the candidate network of the terminal contained in the handover response message, the third network-side device being applied to the third network.

In a possible design, before receiving, by the first network-side device, the handover response message sent by the third network-side device, the method further includes:

completing, by the first network-side device, a handover operation of the terminal according to the handover preparation resource of the first network and sending a handover completed message to the third network-side device, the handover completed message being used for the third network-side device to send the handover response message to the first network-side device, the third network-side device being applied to the third network, and the handover operation being used for the terminal to be handed over from the third network to the first network.

In a possible design, the candidate network further includes a fourth network, and the association information of the candidate network further includes a handover preparation resource of the fourth network.

In a second aspect, according to an embodiment of the present disclosure, there is provided a resource processing method, including:

sending, by a third network-side device, a handover response message to a first network-side device, the handover response message containing association information of a candidate network of a terminal, the candidate network at least including a second network, the terminal being handed over from a third network to a first network, the first network-side device being applied to the first network, the third network-side device being applied to the third network, the association information of the candidate network being used for the first network-side device to release a handover preparation resource of the second network, and the handover preparation resource of the second network being used for the terminal to be handed over from the third network to the second network.

In a possible design, the sending, by the third network-side device, the handover response message to the first network-side device, includes:

receiving, by the third network-side device, a handover completed message sent by the first network-side device and sending the handover response message to the first network-side device, the handover response message being sent by the first network-side device after completing a handover operation of the terminal according to handover preparation resource of the first network, the handover operation being used for the terminal to be handed over from the third network to the first network.

In a possible design, before receiving, by the third network-side device, the handover completed message sent by the first network-side device, the method further includes:

sending, by the third network-side device, a first handover request to the first network-side device, the first handover request being used to instruct the first network-side device to configure the handover preparation resource of the first network for the terminal, and send description information of the handover preparation resource of the first network to the third network-side device; and sending, by the third network-side device, handover configuration information to the terminal, the handover configuration information being used to instruct the terminal to measure the first network to obtain a first measurement result, and when it is detected that the first measurement result meets a first measurement event, send a handover confirmation message to the first network-side device, the handover confirmation message being used to instruct the first network-side device to complete a handover operation of the terminal according to the handover preparation resource of the first network.

In a third aspect, according to an embodiment of the present disclosure, there is provided a resource processing method, including:

obtaining, by a first network-side device, association information of a candidate network of a terminal, the candidate network at least including a second network, the terminal being handed over from a third network to a first network, and the first network-side device being applied to the first network; and determining, by the first network-side device, to send a handover completed message to a third network-side device according to the association information of the candidate network, the handover completed message containing instruction information, the instruction information being used to instruct the third network-side device to release a handover preparation resource of the second network.

In one possible example, the determining, by the first network-side device, to send the handover completed message to the third network-side device according to the association information of the candidate network, includes:

when the first network-side device detects that a measurement result of the second network in the association information of the candidate network is smaller than a preset measurement result, determining to send the handover completed message to the third network-side device; or, when the first network-side device detects that a measurement result of the second network in the association information of the candidate network is that there is no Xn interface between the first network and the second network, determining to send the handover completed message to the third network-side device; or, when the first network-side device detects that a measurement result of the second network in the association information of the candidate network is that the first network and the second network are unfriendly networks, determining to send the handover completed message to the third network-side device.

In one possible example, the determining, by the first network-side device, to send the handover completed message to the third network-side device according to the association information of the candidate network, includes:

when the first network-side device detects that a measurement result of the second network in the association information of the candidate network is smaller than a preset measurement result and information of a non-candidate network meets a preset handover condition, determining to send the handover completed message to the third network-side device.

In one possible example, the obtaining, by the first network-side device, the association information of the candidate network of the terminal, includes:

receiving, by the first network-side device, a handover confirmation message sent by the terminal and obtaining the association information of the candidate network of the terminal contained in the handover confirmation message.

In a fourth aspect, according to an embodiment of the present disclosure, there is provided a resource processing method, including:

receiving, by a third network-side device, a handover completed message sent by a first network-side device, the handover completed message containing instruction information, the handover completed message being determined by the first network-side device according to association information of a candidate network of a terminal after obtaining the association information of the candidate network, the candidate network at least including a second network, the terminal being handed over from a third network to a first network and the first network-side device being applied to the first network; and releasing, by the third network-side device, a handover preparation resource of the second network according to the instruction information.

In a fifth aspect, according to an embodiment of the present disclosure, there is provided a resource processing method, including:

obtaining, by a first network-side device, association information of a candidate network of a terminal, the candidate network at least including a second network, the terminal being handed over from a third network to a first network and the first network-side device being applied to the first network; and determining, by the first network-side device, to send a resource release control message to a third network-side device according to the association information of the candidate network, the resource release control message being used to instruct the third network-side device to release a handover preparation resource of the second network.

In one possible example, the determining, by the first network-side device, to send the resource release control message to the third network-side device according to the association information of the candidate network, includes:

when the first network-side device detects that a measurement result of the second network in the association information of the candidate network is smaller than a preset measurement result, determining to send the resource release control message to the third network-side device; or, when the first network-side device detects that a measurement result of the second network in the association information of the candidate network is that there is no Xn interface between the first network and the second network, determining to send the resource release control message to the third network-side device; or, when the first network-side device detects that a measurement result of the second network in the association information of the candidate network is that the first network and the second network are unfriendly networks, determining to send the resource release control message to the third network-side device.

In one possible example, the determining, by the first network-side device, to send the resource release control message to the third network-side device according to the association information of the candidate network, includes:

when the first network-side device detects that a measurement result of the second network in the association information of the candidate network is smaller than a preset measurement result and information of a non-candidate network meets a preset handover condition, determining to send the resource release control message to the third network-side device.

In one possible example, the obtaining, by the first network-side device, the association information of the candidate network of the terminal, includes:

receiving, by the first network-side device, a handover response message sent by the terminal and obtaining the association information of the candidate network of the terminal contained in the handover response message, the third network-side device being applied to the third network.

In a sixth aspect, according to an embodiment of the present disclosure, there is provided a resource processing method, including:

receiving, by a third network-side device, a resource release control message sent by a first network-side device, the resource release control message being determined by the first network-side device according to association information of a candidate network of a terminal after obtaining the association information of the candidate network, the candidate network at least including a second network, the terminal being handed over from a third network to a first network and the first network-side device being applied to the first network; and responding, by the third network-side device, to the resource release control message and releasing a handover preparation resource of the second network.

In a seventh aspect, according to an embodiment of the present disclosure, there is provided a network-side device. The network-side device has a function of realizing the behavior of the first network-side device in the designs of the above methods. The function may be implemented via hardware or corresponding software implemented by hardware. The hardware or software includes one or more modules corresponding to the function described above.

In one possible design, the network-side device includes a processor, and the processor is configured to support the network-side device to implement corresponding functions in the above methods. Furthermore, the network-side device may further include a transceiver, and the transceiver is configured to support communication between the network-side device and a terminal. Furthermore, the network-side device may further include a memory, and the memory is used for coupling with the processor and saving necessary program instructions and data of the network-side device.

In an eighth aspect, according to an embodiment of the present disclosure, there is provided a network-side device. The network-side device has a function of realizing the behavior of the third network-side device in the designs of the above methods. The function may be implemented via hardware or corresponding software implemented by hardware. The hardware or software includes one or more modules corresponding to the function described above.

In one possible design, the network-side device includes a processor, and the processor is configured to support the network-side device to implement corresponding functions in the above methods. Furthermore, the network-side device may further include a transceiver, and the transceiver is configured to support communication between the network-side device and a terminal. Furthermore, the network-side device may further include a memory, and the memory is used for coupling with the processor and saving necessary program instructions and data of the network-side device.

In a ninth aspect, according to an embodiment of the present disclosure, there is provided a mobile communication system. The mobile communication system includes the terminal, the first network-side device and the third network-side device mentioned in the above aspects.

In a tenth aspect, according to an embodiment of the present disclosure, there is provided a computer readable storage medium. The computer readable storage medium stores instructions, which are executed on a computer, causing the computer to implement the method of the first aspect or the second aspect or the third aspect or the fourth aspect or the fifth aspect or the sixth aspect.

In an eleventh aspect, according to an embodiment of the present disclosure, there is provided a computer program product. The computer program product is executed on a computer, causing the computer to implement the method of the first aspect or the second aspect or the third aspect or the fourth aspect or the fifth aspect or the sixth aspect.

In the third and fourth aspects of the embodiments of the present disclosure, firstly, the first network-side device obtains the association information of the candidate network of the terminal; and secondly, the first network-side device determines to send the handover completed message to the third network-side device according to the association information of the candidate network, the handover completed message containing the instruction information, and the instruction information being used to instruct the third network-side device to release the handover preparation resource of the second network. From above, the first network-side device can instruct the third network-side device to release the handover preparation resource of the second network, so as to avoid the handover preparation resource of the second network being continuously occupied in case that the terminal is not handed over to the second network, which is beneficial to improve utilization efficiency of resources of the second network.

In the fifth and sixth aspects of the embodiments of the present disclosure, firstly, the first network-side device obtains the association information of the candidate network of the terminal; and secondly, the first network-side device determines to send the resource release control message to the third network-side device according to the association information of the candidate network, the resource release control message being used to instruct the third network-side device to release the handover preparation resource of the second network. From above, the first network-side device can instruct the third network-side device to release the handover preparation resource of the second network, so as to avoid the handover preparation resource of the second network being continuously occupied in case that the terminal is not handed over to the second network, which is beneficial to improve utilization efficiency of resources of the second network.

BRIEF DESCRIPTION OF THE DRAWINGS

The accompanying drawings required by the embodiments or the related art for use of description will be briefly described below.

DETAILED DESCRIPTION

The technical solutions in the embodiments of the present disclosure will be described below in combination with the drawings.

In the current implementation scheme, after the terminal is handed over from the third network to the first network, a handover preparation resource of other candidate network(s) (the candidate network(s) other than the first network, such as the second network) are not processed in time, which may cause additional signaling overhead and waste of resources.

Figure 1:
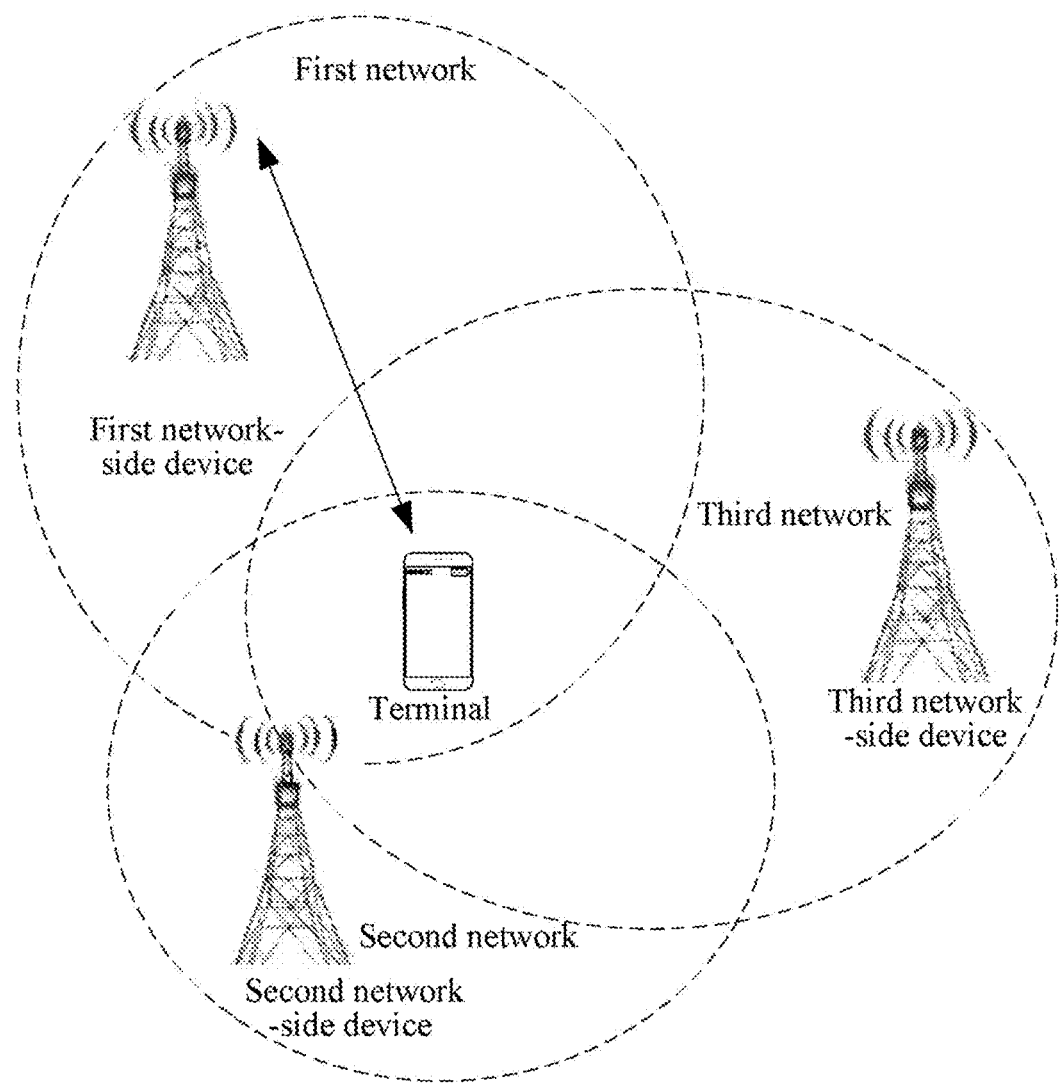
FIG. 1 is a network architecture diagram of a mobile communication system provided by an embodiment of the present disclosure.

FIG. 1 illustrates a possible network architecture provided by an embodiment of the present disclosure. As shown in FIG. 1, the network architecture includes a network-side device and a terminal, where the network-side device includes a first network-side device of a first network, a second network-side device of a second network and a third network-side device of a third network. When the terminal accesses a mobile communication network provided by the network-side device, the terminal and the network-side device may communicate via a wireless link. The network-side device may be, for example, an access network device in 5G network, 4G network and other standard networks (such as a base station, a Radio Access Network (RAN) network node, a RAN transmission point, etc.). In embodiments of the present disclosure, the terms "network" and "system" are often used interchangeably, and those skilled in the art can understand the meaning thereof. The terminal involved in embodiments of the present disclosure may include various handheld devices, in-vehicle devices, wearable devices, computing devices with wireless communication capabilities or other processing devices connected to a wireless modem, and various forms of User Equipment (UE), Mobile Station (MS), terminal device, etc. For convenience of description, the devices mentioned above are generically referred to as terminals.

Figure 2:
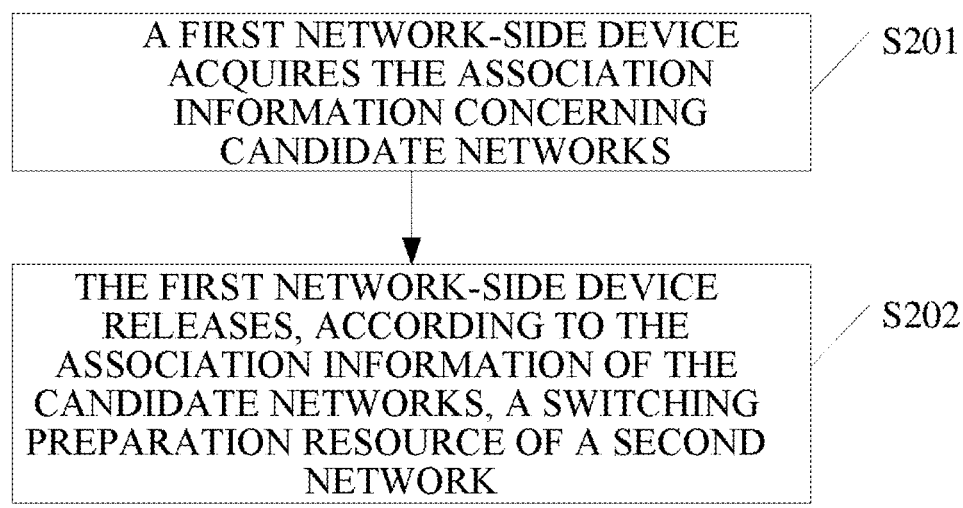
FIG. 2 is a flow chart of a handover control method provided by an embodiment of the present disclosure.

FIG. 2 illustrates a resource processing method provided by an embodiment of the present disclosure, the resource processing method is applied to a mobile communication network including a first network-side device, a second network-side device, a third network-side device and a terminal, and the first network-side device, the second network-side device, the third network-side device, and the terminal are communicated and connected. The method includes a 201 part and a 202 part, and the details are as below.

In the 201 part, the first network-side device obtains association information of a candidate network, the candidate network at least includes a second network, and the first network-side device is applied to a first network.

The association information of the candidate network may be:

a network identification of the candidate network and a measurement result of the candidate network; or, a network identification of the candidate network and a measurement result of the candidate network, and information of a non-candidate network measured by the terminal.

In the 202 part, the first network-side device releases a handover preparation resource of the second network according to the association information of the candidate network.

The handover preparation resource may include a terminal context, a Radio Resource Control (RRC) configuration, a random access resource and a handover link established between the candidate networks for the terminal.

In a possible example, a particular implementation of that the first network-side device releases the handover preparation resource of the second network according to the association information of the candidate network may be:

When detecting that a measurement result of the second network in the association information of the candidate network is smaller than a preset measurement result, the first network-side device determines to release the handover preparation resource of the second network.

In a possible example, a particular implementation of that the first network-side device releases the handover preparation resource of the second network according to the association information of the candidate network may be:

when detecting that a measurement result of the second network in the association information of the candidate network is that there is no Xn interface between the first network and the second network, the first network-side device determines to release the handover preparation resource of the second network.

In a possible example, a particular implementation of that the first network-side device release handover preparation resource of the second network according to the association information of the candidate network may be:

when detecting that a measurement result of the second network in the association information of the candidate network is that the first network and the second network are unfriendly networks, the first network-side device determines to release the handover preparation resource of the second network.

In a possible example, the association information of the candidate network includes the network identification of the candidate network and the measurement result of the candidate network, and the information of the non-candidate network measured by the terminal; a particular implementation of that the first network-side device releases the handover preparation resource of the second network according to the association information of the candidate network may be:

when detecting that a measurement result of the second network in the association information of the candidate network is smaller than a preset measurement result and the information of the non-candidate network meets a preset handover condition, the first network-side device determines to release the handover preparation resource of the second network.

The information of the non-candidate network is a measurement result of the non-candidate network, and a particular implementation of that the information of the non-candidate network meets the preset handover condition is: the measurement result of the non-candidate network is larger than a first preset measurement result (the first preset measurement result may be the same as the above preset measurement result or different from the above preset measurement result). That is, the non-candidate network may be selected as the candidate network and handed over via a network of a UE. In this case, if the first network-side device has detected that the measurement result of the second network is smaller than the preset measurement result, the handover preparation resource of the second network may be released, and the implementation can ensure that there is at least one candidate network of the terminal to complete the switching operation.

It is thus clear that in the embodiments of the present disclosure, after the terminal is handed over from the third network to the first network, firstly, the first network-side device obtains the association information of the candidate network of the terminal; and secondly, the first network-side device releases the handover preparation resource of the second network according to the association information of the candidate network. From above, a network-side device of the network to which the terminal newly switches can release the handover preparation resource of the candidate network in time according to the association information of the candidate network except the current network, so as to avoid the resources of the candidate network other than the current network of the terminal being meaninglessly and continuously occupied, which is beneficial to improve utilization efficiency of resources of the candidate network.

In a possible example, the first network-side device obtains the association information of the candidate network of the terminal, including:

the first network-side device receives a handover confirmation message sent by the terminal and obtains the association information of the candidate network of the terminal contained in the handover confirmation message.

In a possible example, the first network-side device receives the handover confirmation message sent by the terminal, including:

the third network-side device sends a first handover request to the first network-side device.

The first network-side device receives the first handover request sent by the third network-side device, configures a handover preparation resource of the first network for the terminal and sends description information of the handover preparation resource of the first network to the third network-side device.

The third network-side device receives the description information of the handover preparation resource of the first network and sends handover configuration information of the first network to the terminal.

The terminal receives the handover configuration information of the first network, measures a network channel condition of the first network to obtain a first measurement result, and when detecting that the first measurement result meets the first measurement event, sends the handover confirmation message to the first network-side device.

The handover configuration information of the first network may be, for example, a network identification of the candidate network and description information of the handover preparation resource of the candidate network, the handover preparation resource may be a handover preparation resource configured by a network-side device of the candidate network for the terminal to be handed over to a corresponding network, such as a handover preparation resource for handing over to the second network.

The first measurement event may be configured by the third network-side device in advance for the terminal, and the first measurement event may be particularly that the first measurement result is larger than the preset measurement result, the first measurement result may be a difference value obtained by subtracting measurement data of the first network from measurement data of the third network, and the measurement data may be any one type as below: Reference Signal Received Power (RSRP), Received Signal Strength Indication (RSSI), Reference Signal Received Quality (RSRQ) and an offset value (A3 Offset) of service quality of a neighboring cell over service quality of a serving cell. The first measurement result may be particularly a difference value obtained by subtracting the measurement data of the first network from measurement data of the third network.

In a possible example, the first network-side device obtains the association information of the candidate network of the terminal, including:

the first network-side device receives a handover response message sent by the third network-side device and obtains the association information of the candidate network of the terminal contained in the handover response message, where the third network-side device is applied to the third network.

In the possible example, before the first network-side device receives the handover response message sent by the third network-side device, the method further includes:

the first network-side device completes a handover operation of the terminal according to the handover preparation resource of the first network and sends a handover completed message to the third network-side device, where the handover completed message is used for the third network-side device to send the handover response message to the first network-side device, the third network-side device is applied to the third network and the handover operation is used for the terminal to be handed over from the third network to the first network.

In the possible example, a particular implementation of that the first network-side device completes the handover operation of the terminal according to the handover preparation resource of the first network is:

sending, by the third network-side device, a first handover request to the first network-side device; and receiving the first handover request, configuring the handover preparation resource of the first network for the terminal, and sending description information of the handover preparation resource of the first network to the third network-side device, by the first network-side device.

The third network-side device receives the description information and sends handover configuration information of the first network to the terminal.

The terminal receives the handover configuration information of the first network, measures a network channel condition of the first network to obtain a first measurement result, and when detecting that the first measurement result meets the first measurement event, sends a handover confirmation message to the first network-side device.

The first network-side device receives the handover confirmation message sent by the terminal and completes a handover operation of the terminal according to the handover preparation resource of the first network.

The handover configuration information may be, for example, a network identification of the candidate network and description information of the handover preparation resource of the candidate network. The first measurement event may be configured in advance by the third network-side device for the terminal.

In the possible example, the method further includes:

sending, by the third network-side device, a second handover request to the second network-side device, the second network-side device being applied to the second network; and receiving the second handover request, configuring the handover preparation resource of the second network for the terminal, and sending description information of the handover preparation resource of the second network to the third network-side device, by the second network-side device.

The third network-side device receives the description information of the handover preparation resource of the second network and sends handover configuration information of the second network to the terminal.

The terminal receives the handover configuration information of the second network, measures a network channel condition of the second network to obtain a second measurement result, and when detecting that the second measurement result doesn't meet the first measurement event, reports the second measurement result to the third network-side device, or does not report the second measurement result to the third network-side device.

In the possible example, the method further includes:

sending, by the first network-side device, a third handover request to the fourth network-side device, the fourth network-side device being applied to the fourth network and the fourth network being a candidate network of the terminal; and receiving the third handover request and configuring the handover preparation resource of the fourth network for the terminal, by the fourth network-side device.

After the terminal is handed over from the third network to the first network, the first network-side device determines that the fourth network maintains to be a candidate network and may send the third handover request to the fourth network-side device to request the fourth network-side device to configure the handover preparation resource of the fourth network for the terminal, so that a continuity of network handover of the terminal can be ensured, and it is avoided that the terminal cannot be handed over from the first network to the fourth network in time, which is beneficial to improve stability of the terminal handed over between different networks.

In a possible example, before sending, by the third network-side device, a first handover request to the first network-side device, the method further includes:

the terminal measuring a channel condition of at least one network according to a preset measurement configuration to obtain a third measurement result, and when detecting that the third measurement result meets a third measurement event, reporting the third measurement result to the third network-side device.

The third network-side device determines at least one candidate network from the at least one network according to the third measurement result, where the at least one candidate network includes the first network and the second network.

The preset measurement configuration is a measurement configuration used for a network handover, and the measurement configuration includes a measurement object, a measurement reporting standard, a measurement quantity and a reporting quantity.

In a possible example, the candidate network further includes the fourth network, and the association information of the candidate network further includes a handover preparation resource of the fourth network. The handover preparation resource may include a terminal context, a Radio Resource Control (RRC) configuration, a random access resource and a handover link established between the candidate networks for the terminal.

After the terminal is handed over from the third network to the first network, the first network-side device determines that the fourth network maintains to be a candidate network and may directly obtain the handover preparation resource of the fourth network from the association information of the candidate network without sending a handover request to the fourth network-side device to request the fourth network-side device to configure the handover preparation resource of the fourth network for the terminal, which is beneficial to reduce the signaling overhead of network-side and improve management efficiency of the handover preparation resource.

Figure 3:
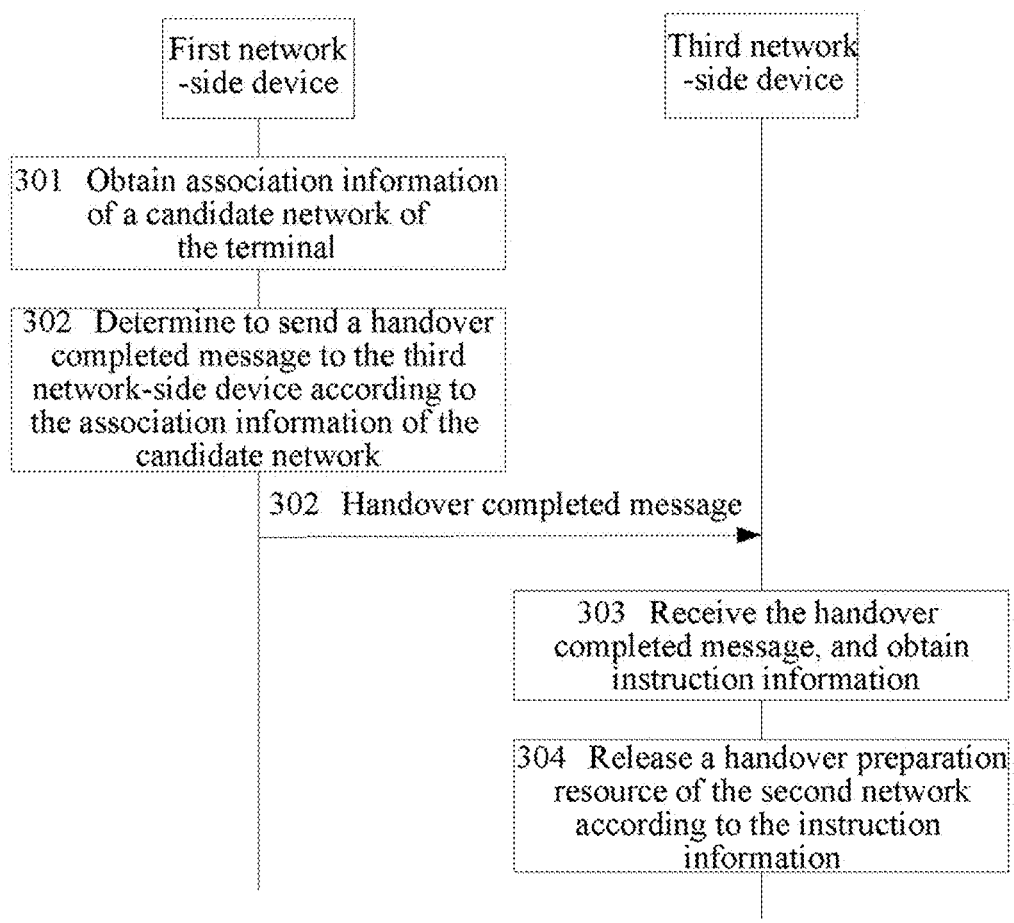
FIG. 3 is a flow chart of a handover control method provided by an embodiment of the present disclosure.

FIG. 3 illustrates a resource processing method provided by an embodiment of the present disclosure, the resource processing method is applied to a mobile communication network including a first network-side device, a second network-side device, a third network-side device and a terminal, and the first network-side device, the second network-side device, the third network-side device, and the terminal are communicated with each other. As shown in FIG. 3, the method includes a 301 part to a 304 part, and the details are as below.

In the 301 part, the first network-side device obtains association information of a candidate network of the terminal, the candidate network at least includes a second network, the terminal is handed over from a third network to a first network, and the first network-side device is applied to the first network.

In the 302 part, the first network-side device determines to send a handover completed message to the third network-side device according to the association information of the candidate network, where the handover completed message contains instruction information, and the instruction information is used to instruct the third network-side device to release a handover preparation resource of the second network.

In the 303 part, the third network-side device receives the handover completed message sent by the first network-side device, where the handover completed message contains the instruction information and the handover completed message is determined by the first network-side device according to association information of a candidate network of the terminal after obtaining the association information of the candidate network, the candidate network at least includes the second network, the terminal is handed over from the third network to the first network, and the first network-side device is applied to the first network.

In the 304 part, the third network-side device releases a handover preparation resource of the second network according to the instruction information.

It is thus clear that in the embodiments of the present disclosure, firstly, the first network-side device obtains the association information of the candidate network of the terminal; and secondly, the first network-side device determines to send the handover completed message to the third network-side device according to the association information of the candidate network, where the handover completed message contains the instruction information, and the instruction information is used to instruct the third network-side device to release the handover preparation resource of the second network. From above, the first network-side device can instruct the third network-side device to release the handover preparation resource of the second network, so as to avoid the handover preparation resource of the second network to be continuously occupied in case that the terminal is not handed over to the second network, which is beneficial to improve utilization efficiency of resources of the second network.

In one possible example, the determining, by the first network-side device, to send the handover completed message to the third network-side device according to the association information of the candidate network, includes:

when the first network-side device detects that a measurement result of the second network in the association information of the candidate network is smaller than a preset measurement result, determining to send the handover completed message to the third network-side device; or, when the first network-side device detects that a measurement result of the second network in the association information of the candidate network is that there is no Xn interface between the first network and the second network, determining to send the handover completed message to the third network-side device; or, when the first network-side device detects that a measurement result of the second network in the association information of the candidate network is that the first network and the second network are unfriendly networks, determining to send the handover completed message to the third network-side device.

In one possible example, the determining, by the first network-side device, to send the handover completed message to the third network-side device according to the association information of the candidate network, includes:

when the first network-side device detects that a measurement result of the second network in the association information of the candidate network is smaller than a preset measurement result and information of the non-candidate network meets a preset handover condition, determining to send the handover completed message to the third network-side device.

In one possible example, the obtaining, by the first network-side device, the association information of the candidate network of the terminal, includes:

receiving a handover confirmation message sent by the terminal and obtaining the association information of the candidate network of the terminal contained in the handover confirmation message, by the first network-side device.

Figure 4:
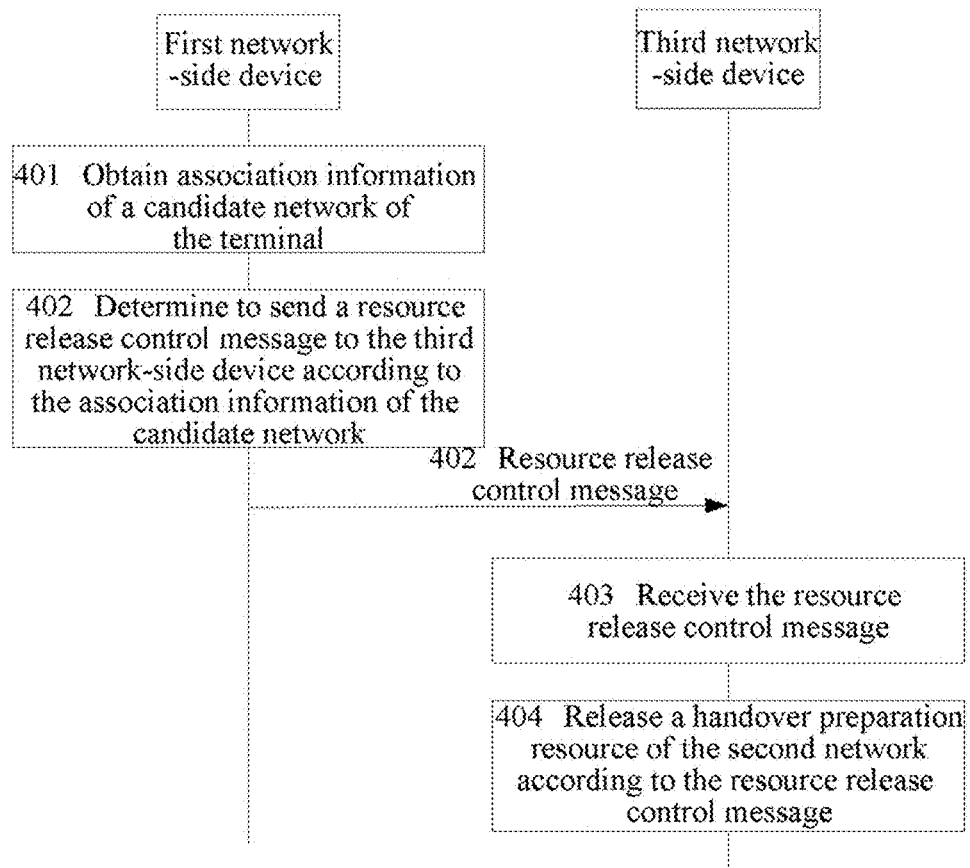
FIG. 4 is a flow chart of a handover control method provided by an embodiment of the present disclosure.

FIG. 4 illustrates a resource processing method provided by an embodiment of the present disclosure, the resource processing method is applied to a mobile communication network including a first network-side device, a second network-side device, a third network-side device and a terminal, and the first network-side device, the second network-side device, the third network-side device, and the terminal are communicated with each other. As shown in FIG. 4, the method includes a 401 part to a 404 part, and the details are as below.

In the 401 part, the first network-side device obtains association information of a candidate network for the terminal, the candidate network at least includes a second network, the terminal is handed over from a third network to a first network, and the first network-side device is applied to the first network.

In the 402 part, the first network-side device determines to send a resource release control message to the third network-side device according to the association information of the candidate network, where the resource release control message is used to instruct the third network-side device to release a handover preparation resource of the second network.

In the 403 part, the third network-side device receives the resource release control message sent by the first network-side device, where the resource release control message is determined by the first network-side device according to association information of a candidate network of the terminal after obtaining the association information of the candidate network, the candidate network at least include the second network, the terminal is handed over from the third network to the first network and the first network-side device is applied to the first network.

In the 404 part, the third network-side device responds to the resource release control message and releases the handover preparation resource of the second network.

It is thus clear that in the embodiments of the present disclosure, firstly, the first network-side device obtains the association information of the candidate network of the terminal; and secondly, the first network-side device determines to send the resource release control message to the third network-side device according to the association information of the candidate network, the resource release control message being used to instruct the third network-side device to release the handover preparation resource of the second network. From above, the first network-side device can instruct the third network-side device to release the handover preparation resource of the second network, so as to avoid the handover preparation resource of the second network being continuously occupied in case that the terminal is not handed over to the second network, which is beneficial to improve utilization efficiency of resources of the second network.

In one possible example, the determining, by the first network-side device, to send the resource release control message to the third network-side device according to the association information of the candidate network, includes:

when the first network-side device detects that a measurement result of the second network in the association information of the candidate network is smaller than a preset measurement result, determining to send the resource release control message to the third network-side device; or, when the first network-side device detects that a measurement result of the second network in the association information of the candidate network is that there is no Xn interface between the first network and the second network, determining to send the resource release control message to the third network-side device; or, when the first network-side device detects that a measurement result of the second network in the association information of the candidate network is that the first network and the second network are unfriendly networks, determining to send the resource release control message to the third network-side device.

In one possible example, the determining, by the first network-side device, to send the resource release control message to the third network-side device according to the association information of the candidate network, includes:

when the first network-side device detects that a measurement result of the second network in the association information of the candidate network is smaller than the preset measurement result and information of the non-candidate network meets a preset handover condition, determining to send the resource release control message to the third network-side device.

In one possible example, the obtaining, by the first network-side device, the association information of the candidate network of the terminal, includes:

receiving a handover response message sent by the terminal and obtaining the association information of the candidate network of the terminal contained in the handover response message, by the first network-side device, the third network-side device being applied to the third network.

The foregoing describes the solutions of the embodiments of the present disclosure mainly from the perspective of interactions between individual network elements. It can be understood that, in order to implement the above functions, the network-side device includes corresponding hardware structures and/or software modules for performing various functions. It should be easy for those skilled in the art to think of that the present disclosure can be implemented in a form of hardware or a combination of hardware and computer software in combination with the units and algorithm steps of the various examples described in the embodiments disclosed herein. Whether a function is implemented in hardware or hardware driven by computer software depends on specific applications and design constraints of the technical solution. Those skilled in the art may use different methods to implement the described functions for each particular application, and such implementation should not be considered to be go beyond the scope of the present disclosure.

In the embodiments of the present disclosure, the network-side device may be divided into functional units according to the foregoing method examples. For example, the network-side device may be divided into functional units corresponding to each function, or two or more functions may be integrated into one processing unit. The above integrated unit may be implemented in form of hardware or in form of a software functional unit. It should be noted that the division of the units in the embodiments of the present disclosure is illustrative, and is merely a type of logical function division, and there may be other division manners during practical implementation.

Figure 5A:
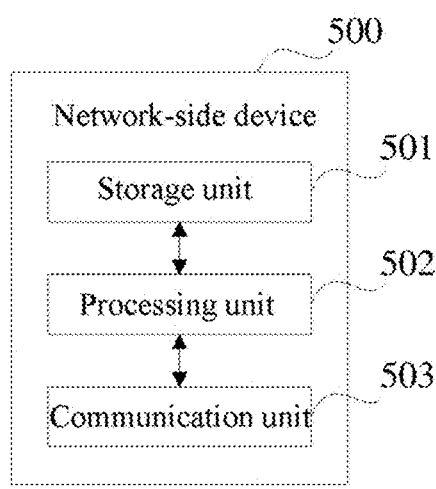
FIG. 5A is a structure diagram of a network-side device provided by an embodiment of the present disclosure.

In the case that integrated units are adopted, FIG. 5A illustrates a possible structural diagram of a network-side device involved in the foregoing embodiments, where the network-side device is the first network-side device in the mobile communication system shown in FIG. 1. The network-side device 500 includes a processing unit 502 and a communication unit 503, where the processing unit 502 is configured to control and manage operations of the network-side device. For example, the processing unit 502 is configured to support the network-side device to perform steps 201 and 202 in FIG. 2, steps 301 and 302 in FIG. 3, steps 401 and 402 in FIG. 4, and/or other processes of techniques described herein. The communication unit 503 is configured to support communication between the network-side device and other devices, for example, communication with the second network-side device, the third network-side device and the terminal shown in FIG. 1. The network-side device may further include a storage unit 501, and the storage unit 501 is configured to store program codes and data of the network-side device.

The processing unit 502 may be a processor or a controller, for example, may be a Central Processing Unit (CPU), a general-purpose processor, a Digital Signal Processor (DSP), an Application-Specific Integrated Circuit (ASIC), a Field Programmable Gate Array (FPGA) or other programmable logic device, transistor logic device, hardware component or any combination thereof. It may implement or perform various illustrative logical blocks, modules and circuits described in the present disclosure. The processor may also be a combination of components implementing computing functions, for example, including one microprocessor or a combination of a plurality of microprocessors, a combination of a DSP and a microprocessor, etc. The communication unit 503 may be a transceiver, a transceiver circuit, or the like, and the storage unit 501 may be a memory.

The processing unit 502 is configured to obtain the association information of the candidate network of the terminal via the communication unit 503, where the candidate network at least includes the second network, the terminal is handed over from the third network to the first network and the first network-side device is applied to the first network; and configured to release the handover preparation resource of the second network according to the association information of the candidate network, where the handover preparation resource is used for the terminal to be handed over from the third network to the second network.

In one possible example, the processing unit 502 is particularly configured to, when it is detected that the measurement result of the second network in the association information of the candidate network is smaller than the preset measurement result, determine to release the handover preparation resource of the second network; or, the processing unit is particularly configured to, when it is detected that the measurement result of the second network in the association information of the candidate network is that there is no Xn interface between the first network and the second network, determine to release the handover preparation resource of the second network; or, the processing unit is particularly configured to, when it is detected that the measurement result of the second network in the association information of the candidate network is that the first network and the second network are unfriendly networks, determine to release the handover preparation resource of the second network.

In one possible example, the processing unit 502 is particularly configured to, when it is detected that the measurement result of the second network in the association information of the candidate network is smaller than the preset measurement result and the information of a non-candidate network meets the preset handover condition, determine to release the handover preparation resource of the second network.

In one possible example, the processing unit 502 is particularly configured to receive the handover confirmation message sent by the terminal via the communication unit and obtain the association information of the candidate network of the terminal contained in the handover confirmation message.

In one possible example, the processing unit 502 is particularly configured to receive the first handover request sent by the third network-side device via the communication unit 503, configure the handover preparation resource of the first network for the terminal and send the description information of the handover preparation resource of the first network to the third network-side device, where the description information is used for the third network-side device to send the handover configuration information of the first network to the terminal and the handover configuration information of the first network is used to instruct the terminal to measure the first network to obtain a first measurement result, and when detecting that the first measurement result meets the first measurement event, send the handover confirmation message to the first network-side device; and the processing unit 502 is configured to receive the handover confirmation message sent by the terminal via the communication unit 503 and complete the handover operation of the terminal according to the handover preparation resource of the first network.

In one possible example, the processing unit 502 is particularly configured to receive the handover response message sent by the third network-side device via the communication unit and obtain the association information of the candidate network of the terminal contained in the handover response message, where the third network-side device is applied to the third network.

In one possible example, before receiving the handover response message sent by the third network-side device, the processing unit 502 is further configured to complete the handover operation of the terminal according to the handover preparation resource of the first network and send the handover completed message to the third network-side device, where the handover completed message is used for the third network-side device to send the handover response message to the first network-side device, the third network-side device is applied to the third network, and the handover operation is used for the terminal to be handed over from the third network to the first network.

In one possible example, the candidate network further includes the fourth network, and the association information of the candidate network further includes the handover preparation resource of the fourth network.

The processing unit 502 is further configured to obtain the association information of the candidate network of the terminal via the communication unit 503, where the candidate network at least includes the second network, the terminal is handed over from a third network to a first network and the first network-side device is applied to the first network; and the processing unit 502 is configured to determine to send the handover completed message to the third network-side device according to the association information of the candidate network, where the handover completed message contains the instruction information and the instruction information is used to instruct the third network-side device to release the handover preparation resource of the second network.

In one possible example, the processing unit 502 is particularly configured to, when it is detected that the measurement result of the second network in the association information of the candidate network is smaller than the preset measurement result, determine to send the handover completed message to the third network-side device; or when it is detected that the measurement result of the second network in the association information of the candidate network is that there is no Xn interface between the first network and the second network, determine to send the handover completed message to the third network-side device; or when it is detected that the measurement result of the second network in the association information of the candidate network is that the first network and the second network are unfriendly networks, determine to send the handover completed message to the third network-side device.

In one possible example, the processing unit 502 is particularly configured to, when it is detected that a measurement result of the second network in the association information of the candidate network is smaller than the preset measurement result and information of the non-candidate network meets the preset handover condition, determine to send the handover completed message to the third network-side device.

In one possible example, the processing unit 502 is particularly configured to receive the handover confirmation message sent by the terminal via the communication unit 503 and obtain the association information of the candidate network of the terminal contained in the handover confirmation message.

The processing unit 502 is further configured to obtain the association information of the candidate network of the terminal via the communication unit 503, where the candidate network at least includes the second network, the terminal is handed over from the third network to the first network and the first network-side device is applied to the first network; and the processing unit 502 is configured to determine to send the resource release control message to the third network-side device according to the association information of the candidate network, the resource release control message is used to instruct the third network-side device to release the handover preparation resource of the second network.

In one possible example, the processing unit 502 is particularly configured to, when it is detected that the measurement result of the second network in the association information of the candidate network is smaller than the preset measurement result, determine to send the resource release control message to the third network-side device; or when it is detected that the measurement result of the second network in the association information of the candidate network is that there is no Xn interface between the first network and the second network, determining to send the resource release control message to the third network-side device; or when it is detected that the measurement result of the second network in the association information of the candidate network is that the first network and the second network are unfriendly networks, determining to send the resource release control message to the third network-side device.

In one possible example, the processing unit 502 is particularly configured to, when it is detected that the measurement result of the second network in the association information of the candidate network is smaller than preset measurement result and the information of the non-candidate network meets the preset handover condition, determine to send the resource release control message to the third network-side device.

In one possible example, the processing unit 502 is particularly configured to receive the handover response message sent by the third network-side device via the communication unit 503 and obtain the association information of the candidate network of the terminal contained in the handover response message, where the third network-side device is applied to the third network.

Figure 5B:
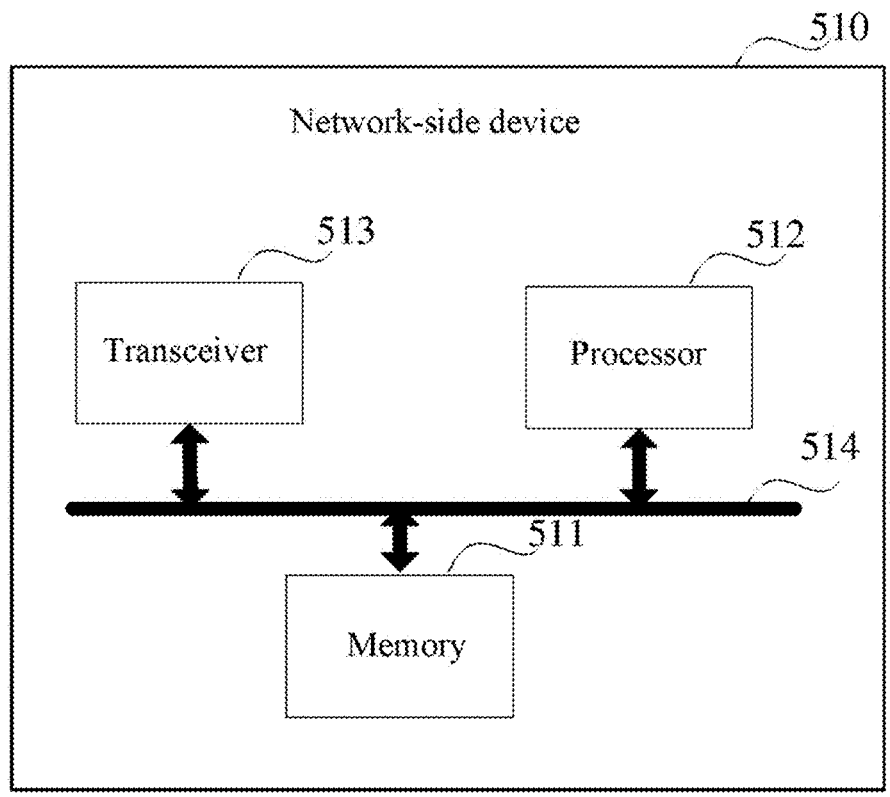
FIG. 5B is a structure diagram of another network-side device provided by an embodiment of the present disclosure.

When the processing unit 502 is a processor, the communication unit 503 is a communication interface and the storage unit 501 is a memory, the network-side devices according to embodiments of the present disclosure may be the network-side device shown in FIG. 5B.

With reference to FIG. 5B, the network-side device 510 includes a processor 512, a communication interface 513, and a memory 511. Optionally, the network-side device 510 may further include a bus 514. The communication interface 513, the processor 512 and the memory 511 may be connected to each other via the bus 514. The bus 514 may be a Peripheral Component Interconnect (PCI) bus or an Extended Industry Standard Architecture (EISA) bus and the like. The bus 514 may be divided into an address bus, a data bus, a control bus, and the like. For convenience of representation, the bus 514 is indicated only by one thick line as shown in FIG. 5B, but it does not mean that there is only one bus or one type of bus.

The network-side device shown in FIG. 5A or FIG. 5B may also be understood as a device used for the first network-side device, which is not limited in the embodiments of the present disclosure.

Figure 6A:
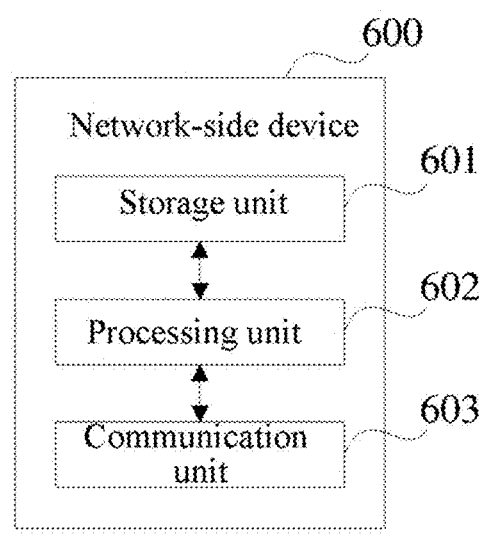
FIG. 6A is a structure diagram of a network-side device provided by an embodiment of the present disclosure.

In the case that integrated units are adopted, FIG. 6A illustrates a possible structural diagram of a network-side device involved in the foregoing embodiments, where the network-side device is the third network-side device in the mobile communication system shown in FIG. 1. The network-side device 600 includes a processing unit 602 and a communication unit 603, where the processing unit 602 is configured to control and manage operations of the network-side device. For example, the processing unit 602 is configured to support the network-side device to perform steps 303 and 304 in FIG. 3, steps 403 and 404 in FIG. 4 and/or other processes of techniques described herein. The communication unit 603 is configured to support communication between the network-side device and other devices, for example, communication with the first network-side device, the second network-side device and the terminal shown in FIG. 1. The network-side device may further include a storage unit 601, which is configured to store program codes and data of the network-side device.

The processing unit 602 may be a processor or a controller, for example, may be a Central Processing Unit (CPU), a general-purpose processor, a Digital Signal Processor (DSP), an Application-Specific Integrated Circuit (ASIC), Field Programmable Gate Array (FPGA) or other programmable logic device, transistor logic device, hardware component or any combination thereof. It may implement or perform various illustrative logical blocks, modules and circuits described in the present disclosure. The processor may also be a combination of components implementing computing functions, for example, including one microprocessor or a combination of a plurality of microprocessors combinations, a combination of a DSP and a microprocessor, etc. The communication unit 603 may be a transceiver, a transceiver circuit, or the like, and the storage unit 601 may be a memory.

The processing unit 602 is configured to send the handover response message to the first network-side device via the communication unit 603, where the handover response message contains the association information of the candidate network of the terminal, the candidate network at least includes the second network, the terminal is handed over from the third network to the first network, the first network-side device is applied to the first network, the third network-side device is applied to the third network, the association information of the candidate network is used for the first network-side device to release the handover preparation resource of the second network, and the handover preparation resource of the second network is used for the terminal to be handed over from the third network to the second network.

In one possible example, the processing unit 602 is particularly configured to receive a handover completed message sent by the first network-side device and send the handover response message to the first network-side device via the communication unit 603, where the handover response message is sent by the first network-side device according to the handover preparation resource of the first network after completing the handover operation of the terminal, and the handover operation is used for the terminal to be handed over from the third network to the first network.

In one possible example, before receiving the handover completed message sent by the first network-side device via the communication unit 603, the processing unit 602 is further configured to send the first handover request to the first network-side device, where the first handover request is used to instruct the first network-side device to configure the handover preparation resource of the first network for the terminal, and used to send the description information of the handover preparation resource of the first network to the third network-side device; and configured to send the handover configuration information to the terminal via the communication unit 603, where the handover configuration information is used to instruct the terminal to measure the first network to obtain the first measurement result, and when detecting that the first measurement result meets the first measurement event, send the handover confirmation message to the first network-side device, where the handover confirmation message is used to instruct the first network-side device to complete the handover operation of the terminal according to the handover preparation resource of the first network.

The processing unit 602 is further configured to receive the handover completed message sent by the first network-side device via the communication unit 603, where the handover completed message contains instruction information, the handover completed message is determined by the first network-side device according to association information of a candidate network of the terminal after obtaining the association information of the candidate network, the candidate network at least includes the second network, the terminal is handed over from the third network to the first network and the first network-side device is applied to the first network; and configured to release the handover preparation resource of the second network according to the instruction information.

The processing unit 602 is further configured to receive the resource release control message sent by the first network-side device, where the resource release control message is determined by the first network-side device according to association information of a candidate network of the terminal after obtaining the association information of the candidate network, the candidate network at least includes the second network, the terminal is handed over from the third network to the first network and the first network-side device is applied to the first network; and configured to respond to the resource release control message and release handover preparation resource of the second network.

Figure 6B:
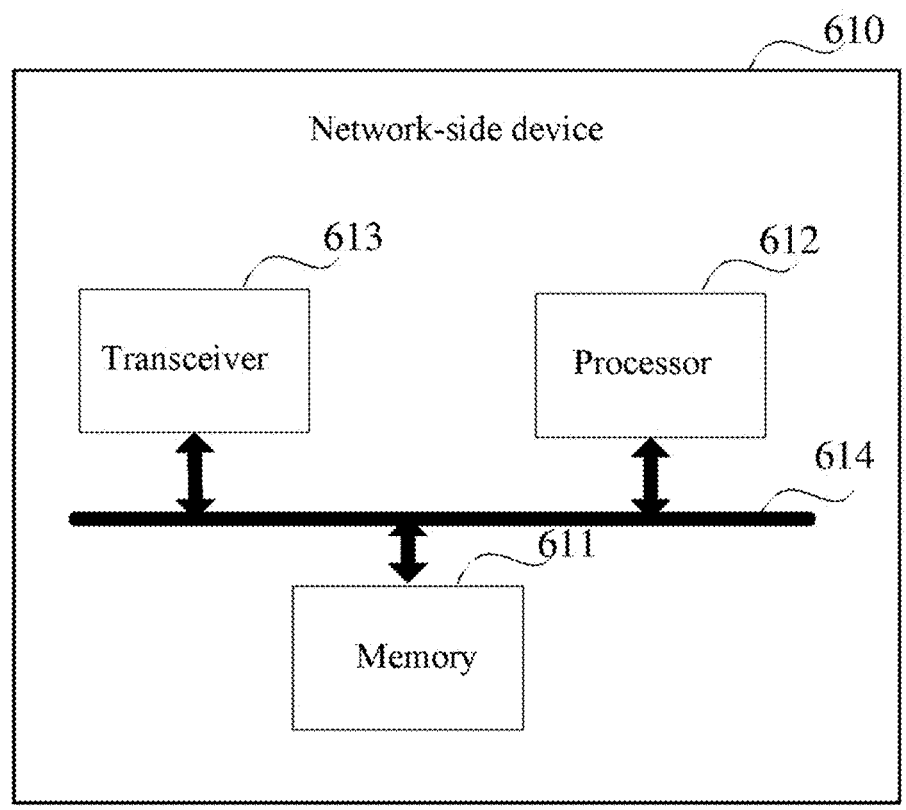
FIG. 6B is a structure diagram of another network-side device provided by an embodiment of the present disclosure.

When the processing unit 602 is a processor, the communication unit 603 is a communication interface and the storage unit 601 is a memory, the network-side devices involved in the embodiments of the present disclosure may be the network-side device shown in FIG. 6B.

With reference to FIG. 6B, the network-side device 610 includes a processor 612, a communication interface 613, and a memory 611. Optionally, the network-side device 610 may further include a bus 614. The communication interface 613, the processor 612 and the memory 611 may be connected to each other via the bus 614. The bus 614 may be a Peripheral Component Interconnect (PCI) bus or an Extended Industry Standard Architecture (EISA) bus and the like. The bus 614 may be divided into an address bus, a data bus, a control bus, and the like. For convenience of representation, the bus 614 is indicated only one thick line as shown in FIG. 6B, but it does not mean that there is only one bus or one type of bus.

It may also be understood that the network-side device shown in FIG. 6A or FIG. 6B is a device used for the third network-side device, which is not limited in the embodiments of the present disclosure.

According to the embodiments of the present disclosure, there is further provided a mobile communication system, where the mobile communication system includes the network-side device shown in FIG. 5A or FIG. 5B, the network-side device shown in FIG. 6A or FIG. 6B, and a terminal.

The steps of the method or algorithm described in the embodiments of the present disclosure may be implemented in form of hardware, or may be implemented by a processor executing software instructions. The software instructions may be composed of corresponding software modules, which may be stored in a Random Access Memory (RAM), a flash memory, a Read Only Memory (ROM), an Erasable Programmable ROM (EPROM), an Electrically EPROM (EEPROM), a register, a hard disk, a removable hard disk, a Compact Disk-ROM (CD-ROM) or any other form of storage medium known in the art. An exemplary storage medium is coupled to a processor to enable the processor to read information from, and write information to, the storage medium. The storage medium may also be an integral part of the processor. The processor and the storage medium may be located in an ASIC. Additionally, the ASIC may be located in an access network device, a target network device or a core network device. The processor and the storage medium may also exist as discrete components in the access network device, the target network device or the core network device.

Those skilled in the art should notice that in one or more of the above examples, the functions described in the embodiments of the present disclosure may be all or partially implemented by hardware, software, firmware, or any combination thereof. When being implemented by software, the functions may be all or partially implemented in form of computer program products. The computer program products include one or more computer instructions. When the computer program instructions are loaded and executed on a computer, the processes or functions described according to the embodiments of the present disclosure are generated in whole or in part. The computer may be a general-purpose computer, a special-purpose computer, a computer network, or other programmable device. The computer instructions may be stored in a computer readable storage medium or transferred from one computer readable storage medium to another computer readable storage medium. For example, the computer instructions may be transferred from a website site, a computer, a server or a data center to another website site, computer, server, or data center by wire (e.g., coaxial cable, fiber optic, Digital Subscriber Line (DSL)) or wireless way (e.g., infrared, wireless, microwave, etc.). The computer readable storage medium may be any available medium that can be accessed by a computer or a data storage device such as a server, a data center, or the like that includes one or more available mediums. The available medium may be a magnetic medium (e.g., a floppy disk, a hard disk, a magnetic tape), an optical medium (e.g., a Digital Video Disc (DVD)), or a semiconductor medium (e.g. a Solid State Disk (SSD)), etc.

The specific embodiments described above further explain purposes, technical solutions and beneficial effects of the embodiments of the present disclosure. It should be understood that those described above are merely embodiments of the present disclosure, and are not intended to limit the protection scope of the present disclosure. Any amendments, equivalent substitution, and improvement made based on the technical solutions of the embodiments of the present disclosure shall fall within the protection scope of the embodiments of the present disclosure.

What is claimed is:

1. A resource processing method, comprising:
   obtaining, by a first network-side device, association information of a candidate network of a terminal, wherein the candidate network at least comprises a second network, the terminal is handed over from a third network to a first network, and the first network-side device is applied to the first network; and
   releasing, by the first network-side device, a handover preparation resource of the second network according to the association information of the candidate network, wherein the handover preparation resource of the second network is used for the terminal to be handed over from the third network to the second network, wherein the obtaining, by the first network-side device, the association information of the candidate network of the terminal, comprises:

receiving, by the first network-side device, a handover confirmation message sent by the terminal and obtaining the association information of the candidate network of the terminal contained in the handover confirmation message, and wherein the receiving, by the first network-side device, the handover confirmation message sent by the terminal, comprises:

receiving, by the first network-side device, a first handover request sent by a third network-side device, configuring a handover preparation resource of the first network for the terminal and sending description information of the handover preparation resource of the first network to the third network-side device, wherein the description information is used for the third network-side device to send handover configuration information of the first network to the terminal, the handover configuration information of the first network is used to instruct the terminal to measure the first network to obtain a first measurement result, and when it is detected that the first measurement result meets a first measurement event, send the handover confirmation message to the first network-side device; and receiving, by the first network-side device, the handover confirmation message sent by the terminal and completing a handover operation of the terminal according to the handover preparation resource of the first network.

2. The method according to claim 1, wherein the releasing, by the first network-side device, the handover preparation resource of the second network according to the association information of the candidate network, comprises one of the following:

when the first network-side device detects that a measurement result of the second network in the association information of the candidate network is smaller than a preset measurement result, determining to release the handover preparation resource of the second network;

when the first network-side device detects that a measurement result of the second network in the association information of the candidate network is that there is no Xn interface between the first network and the second network, determining to release the handover preparation resource of the second network; and when the first network-side device detects that a measurement result of the second network in the association information of the candidate network is that the first network and the second network are unfriendly networks, determining to release the handover preparation resource of the second network.

3. The method according to claim 1, wherein the releasing, by the first network-side device, the handover preparation resource of the second network according to the association information of the candidate network, comprises:

when the first network-side device detects that a measurement result of the second network in the association information of the candidate network is smaller than a preset measurement result and information of a non-candidate network meets a preset handover condition, determining to release the handover preparation resource of the second network.

4. The method according to claim 1, wherein the obtaining, by the first network-side device, the association information of the candidate network of the terminal, comprises:

receiving, by the first network-side device, a handover response message sent by a third network-side device and obtaining the association information of the candidate network of the terminal contained in the handover response message, wherein the third network-side device is applied to the third network.

5. The method according to claim 4, wherein before receiving, by the first network-side device, the handover response message sent by the third network-side device, the method further comprises:

completing, by the first network-side device, a handover operation of the terminal according to the handover preparation resource of the first network and sending a handover completed message to the third network-side device, wherein the handover completed message is used for the third network-side device to send the handover response message to the first network-side device, the third network-side device is applied to the third network, and the handover operation is used for the terminal to be handed over from the third network to the first network.

6. The method according to claim 1, wherein the candidate network further comprises a fourth network, and the association information of the candidate network further comprises a handover preparation resource of the fourth network.

7. A network-side device, applied to a mobile communication system comprising a first network-side device, a second network-side device, a third network-side device and a terminal, the network-side device being the first network-side device, and the network-side device comprising:

a processor;
a memory for storing instructions executable by the processor; and
a transceiver;

wherein the processor is configured to:
obtain association information of a candidate network of the terminal via the transceiver, wherein the candidate network at least comprises a second network, the terminal is handed over from a third network to a first network, and the first network-side device is applied to the first network; and the processor is configured to release a handover preparation resource of the second network according to the association information of the candidate network, wherein the handover preparation resource of the second network is used for the terminal to be handed over from the third network to the second network, wherein the processor is further configured to receive a handover confirmation message sent by the terminal via the transceiver and obtain the association information of the candidate network of the terminal contained in the handover confirmation message, and wherein the processor is further configured to receive a first handover request sent by a third network-side device via the transceiver, configure a handover preparation resource of the first network for the terminal and send description information of the handover preparation resource of the first network to the third network-side device, wherein the description information is used for the third network-side device to send handover configuration information of the first network to the terminal, the handover configuration information of the first network is used to instruct the terminal to measure the first network to obtain a first measurement result, and when it is detected that the first measurement result meets a first measurement event, send the handover confirmation message to the first network-side device; and the processor is configured to receive the handover confirmation message sent by the terminal via the transceiver and complete a handover operation of the terminal according to the handover preparation resource of the first network.

8. The network-side device according to claim 7, wherein the processor is further configured to perform one of the following: when it is detected that a measurement result of the second network in the association information of the candidate network is smaller than a preset measurement result, determine to release the handover preparation resource of the second network;

when it is detected that a measurement result of the second network in the association information of the candidate network is that there is no Xn interface between the first network and the second network, determine to release the handover preparation resource of the second network; and when it is detected that a measurement result of the second network in the association information of the candidate network is that the first network and the second network are unfriendly networks, determine to release the handover preparation resource of the second network.

9. The network-side device according to claim 7, wherein the processor is further configured to: when it is detected that a measurement result of the second network in the association information of the candidate network is smaller than a preset measurement result and information of a non-candidate network meets a preset handover condition, determine to release the handover preparation resource of the second network.

10. The network-side device according to claim 7, wherein the processor is further configured to receive a handover response message sent by the third network-side device via the transceiver and obtain the association information of the candidate network of the terminal contained in the handover response message, wherein the third network-side device is applied to the third network.

11. The network-side device according to claim 10, wherein before receiving the handover response message sent by the third network-side device, the processor is further configured to complete a handover operation of the terminal according to the handover preparation resource of the first network and send a handover completed message to the third network-side device, wherein the handover completed message is used for the third network-side device to send the handover response message to the first network-side device, the third network-side device is applied to the third network, and the handover operation is used for the terminal to be handed over from the third network to the first network.

12. The network-side device according to claim 7, wherein the candidate network further comprises a fourth network, and the association information of the candidate network further comprises a handover preparation resource of the fourth network.

13. A network-side device, applied to a mobile communication system comprising a first network-side device, a second network-side device, a third network-side device and a terminal, the network-side device being the third network-side device, and the network-side device comprising:
a processor;
a memory for storing instructions executable by the processor; and
a transceiver;
wherein the processor is configured to: send a handover response message to the first network-side device via the transceiver, wherein the handover response message contains association information of a candidate network of the terminal, the candidate network at least comprises a second network, the terminal is handed over from a third network to a first network, the first network-side device is applied to the first network, the third network-side device is applied to the third network, the association information of the candidate network is used for the first network-side device to release a handover preparation resource of the second network, and the handover preparation resource of the second network is used for the terminal to be handed over from the third network to the second network,
wherein the processor is further configured to receive a handover completed message sent by the first network-side device and send the handover response message to the first network-side device via the transceiver, wherein the handover response message is sent by the first network-side device after completing a handover operation of the terminal according to handover preparation resource of the first network, and the handover operation is used for the terminal to be handed over from the third network to the first network, and
wherein before receiving the handover completed message sent by the first network-side device via the transceiver, the processor is further configured to send a first handover request to the first network-side device, wherein the first handover request is used to instruct the first network-side device to configure the handover preparation resource of the first network for the terminal, and used to send description information of the handover preparation resource of the first network to the third network-side device;
and the processor is configured to send handover configuration information to the terminal via the transceiver, wherein the handover configuration information is used to instruct the terminal to measure the first network to obtain a first measurement result, and when it is detected that the first measurement result meets a first measurement event, send a handover confirmation message to the first network-side device, wherein the handover confirmation message is used to instruct the first network-side device to complete a handover operation of the terminal according to the handover preparation resource of the first network.

* * * * *